(12) United States Patent
Chea et al.

(10) Patent No.: US 9,648,093 B2
(45) Date of Patent: *May 9, 2017

(54) APPLICATION SERVICE PROVIDER DELIVERY SYSTEM

(71) Applicant: PowerReviews OC, LLC, San Francisco, CA (US)

(72) Inventors: Robert S. Chea, San Mateo, CA (US); James Morris, San Francisco, CA (US); Gautam Prabhu, San Francisco, CA (US)

(73) Assignee: PowerReviews OC, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/472,025

(22) Filed: Aug. 28, 2014

(65) Prior Publication Data

US 2014/0372501 A1 Dec. 18, 2014

Related U.S. Application Data

(63) Continuation of application No. 13/089,218, filed on Apr. 18, 2011, now Pat. No. 8,825,793, which is a
(Continued)

(51) Int. Cl.
*H04L 29/08* (2006.01)
*G06Q 30/02* (2012.01)

(52) U.S. Cl.
CPC ......... *H04L 67/10* (2013.01); *G06Q 30/0282* (2013.01); *H04L 67/02* (2013.01);
(Continued)

(58) Field of Classification Search
None
See application file for complete search history.

(56) References Cited

U.S. PATENT DOCUMENTS 5,583,563 A * 12/1996 Wanderscheid ... H04N 7/17318
348/E7.071
6,393,605 B1 5/2002 Loomans
(Continued)

OTHER PUBLICATIONS

Jesse James Garrett, "AJAX: A New Approach to Web Applications," Adaptive Path, Publications, Feb. 18, 2005,http://adaptivepath.com/publications/essays/archives/000385.php, pp. 1-9. [Retrieved Feb. 9, 2007].
(Continued)

*Primary Examiner* — Ranodhi Serrao
(74) *Attorney, Agent, or Firm* — Drinker Biddle & Reath LLP (57) ABSTRACT

In one embodiment, a display engine and one or more data files are determined. They are then sent to a website provider's network. The display engine and data are used to provide ASP functionality without contacting the ASP network for every user request. So even if the ASP network is not available, the ASP functionality provided by the display engine and data is always accessible to the website provider. For example, the website provider's network may provide the ASP functionality by displaying data in one or more data files at a user's display device. This is performed without relying on the availability of the ASP network.

17 Claims, 5 Drawing Sheets

Related U.S. Application Data continuation of application No. 11/546,541, filed on Oct. 11, 2006, now Pat. No. 7,930,363.

(60) Provisional application No. 60/726,356, filed on Oct. 12, 2005.

(52) U.S. Cl.
CPC .............. H04L 67/06 (2013.01); H04L 67/28 (2013.01); H04L 67/2861 (2013.01)

(56) References Cited

U.S. PATENT DOCUMENTS

| | | | |
|---|---|---|---|
| 6,832,366 B2 | 12/2004 | Kouznetsov et al. | |
| 6,925,466 B2 | 8/2005 | Jensen et al. | |
| 7,076,534 B1 | 7/2006 | Cleron et al. | |
| 7,286,836 B2 | 10/2007 | Emmerson et al. | |
| 7,356,590 B2 | 4/2008 | Wilson et al. | |
| 7,444,433 B2 | 10/2008 | Goldstein et al. | |
| 7,930,363 B2 | 4/2011 | Chea et al. | |
| 8,825,793 B2 | 9/2014 | Chea et al. | |
| 2001/0034847 A1* | 10/2001 | Gaul, Jr. | H04L 63/1433 726/25 |
| 2001/0037331 A1* | 11/2001 | Lloyd | G06F 17/3089 |
| 2001/0054108 A1* | 12/2001 | Lincoln | H04L 29/06 709/238 |
| 2002/0012427 A1* | 1/2002 | Rojas | H04M 3/22 379/229 |
| 2002/0022982 A1* | 2/2002 | Cooperstone | G06Q 10/10 705/1.1 |
| 2002/0026507 A1* | 2/2002 | Sears | H04L 41/22 709/224 |
| 2002/0032692 A1* | 3/2002 | Suzuki | G06Q 10/10 |
| 2002/0032797 A1* | 3/2002 | Xu | H04L 29/06 709/238 |
| 2002/0049608 A1* | 4/2002 | Hartsell | G06Q 10/10 709/226 |
| 2002/0049841 A1* | 4/2002 | Johnson | H04L 67/10 709/225 |
| 2002/0052925 A1* | 5/2002 | Kim | H04L 29/06 709/217 |
| 2002/0062403 A1 | 5/2002 | Burnett et al. | |
| 2002/0103660 A1 | 8/2002 | Cramon et al. | |
| 2002/0112035 A1* | 8/2002 | Carey | G06F 17/30867 709/219 |
| 2002/0116453 A1 | 8/2002 | Todorov et al. | |
| 2002/0120741 A1 | 8/2002 | Webb et al. | |
| 2002/0152305 A1 | 10/2002 | Jackson et al. | |
| 2002/0156834 A1 | 10/2002 | Kitada et al. | |
| 2002/0178166 A1 | 11/2002 | Hsia | |
| 2002/0194314 A1 | 12/2002 | Kouznetsov et al. | |
| 2002/0198824 A1 | 12/2002 | Cook | |
| 2003/0009533 A1 | 1/2003 | Shuster | |
| 2003/0009742 A1 | 1/2003 | Bass et al. | |
| 2003/0018714 A1 | 1/2003 | Mikhailov et al. | |
| 2003/0144894 A1 | 7/2003 | Robertson et al. | |
| 2003/0182467 A1 | 9/2003 | Jensen et al. | |
| 2004/0185872 A1 | 9/2004 | Emmerson et al. | |
| 2005/0021409 A1 | 1/2005 | Michaud et al. | |
| 2005/0044197 A1* | 2/2005 | Lai | G06Q 10/10 709/223 |
| 2005/0177813 A1 | 8/2005 | Kayama et al. | |
| 2005/0246649 A1 | 11/2005 | Wilhelm | |
| 2005/0278231 A1 | 12/2005 | Teeter | |
| 2006/0165040 A1 | 7/2006 | Rathod et al. | |
| 2006/0259483 A1 | 11/2006 | Ozana | |
| 2007/0011650 A1 | 1/2007 | Hage et al. | |
| 2007/0016615 A1 | 1/2007 | Mohan et al. | |
| 2007/0022020 A1 | 1/2007 | Bernstein | |
| 2007/0083533 A1 | 4/2007 | Mirkazemi et al. | |
| 2008/0059607 A1 | 3/2008 | Schneider | |

OTHER PUBLICATIONS

Epinions.com—Company Information: About Epinions, http://www/epinions.com/about, Shopping.com, Inc. 1999-20132, pages. [Retrieved Mar. 6, 2013].

* cited by examiner

APPLICATION SERVICE PROVIDER DELIVERY SYSTEM

CROSS REFERENCES TO RELATED APPLICATIONS

This application is a continuation of U.S. application Ser. No. 13/089,218 filed Apr. 18, 2011 (now U.S. Pat. No. 8,825,793), which is a continuation of U.S. application Ser. No. 11/546,541 filed Oct. 11, 2006 (now U.S. Pat. No. 7,930,363), which claims priority from commonly assigned provisional patent application entitled "ASYMMETRICAL APPLICATION SERVICE PROVIDER (ASP) SYSTEM, AN ASP-BASED METHOD FOR ELIMINATING READ DEPENDENCIES ON THE ASP NETWORK WHILE PROVIDING ADVANCED DISPLAY FUNCTIONALITY", application No. 60/726,356, filed Oct. 12, 2005, the disclosures of which are incorporated herein in their entirety by reference.

BACKGROUND

Embodiments of the present invention generally relate to application service providers (ASPs) and more specifically to providing ASP functionality using asymmetrical ASP interaction.

An application service provider (ASP) is a business that provides computer-based services to a website provider. The website provider can then provide the services to users over a network. An example of this business is that of providing access to a particular application program (such as online banking) using a standard protocol such as HTTP.

Currently, ASPs provide access to their services to website providers via 2-way, on-demand communication, i.e., in a symmetrical manner. The ASP network must be available and provide on-demand support for user requests for both data reads (e.g., actions related to data display and presentation) and data writes (e.g., actions related to data creation, updating, or deletion). An example of a data read (in an online banking application) would be looking up a user's current balance, and a data write example would be updating a user's address information.

Accordingly, the ASP network must always be available and accessible. If the ASP network becomes unavailable for any reason, the functionality provided to the website provider's network cannot be accessed by the user. In the online banking example, if the ASP network is not available when a user tries to look up his current balance, then the user would not be able to complete that action. Thus, the website provider cannot provide the functionality to its users until the ASP network is available again. This has many disadvantages. For example, if a website provider is providing an online service, such as an online bank that is dependent on ASP functionality, then not being able to provide the functionality from the ASP may cause the website provider to lose business and alienate users.

SUMMARY OF EMBODIMENTS

Embodiments of the present invention generally relate to providing ASP functionality that typically requires 2-way, on demand communication, without needing on-demand access to the ASP network for certain functionality. These techniques provide application service provider functionality while requiring only single or intermittent contact with an ASP network. Thus, the ASP network does not need to be contacted every time requests are received from a user and processed. This may be referred to as asymmetric ASP interactions.

In one embodiment, a display engine and one or more data files are determined. They are then sent to a website provider's network. The display engine and data are used to provide ASP functionality without contacting the ASP network for every user request. So even if the ASP network is not available, the ASP functionality provided by the display engine and data is always accessible to the website provider. For example, the website provider's network may provide the ASP functionality by displaying data in one or more data files at a user's display device. This is performed without relying on the availability of the ASP network.

In one embodiment, a short script (e.g., JavaScript™) that includes a few lines of code is inserted into a webpage that is stored and accessed at a server at an installation associated with the website provider. Additionally, a display engine and accompanying data are also transferred to the website provider. The script causes data file accesses and invokes display engine functions so that the content described in the data files is displayed, embedded into, or associated with, other webpage content provided by the website provider. In this manner the content and its manner of display and processing can be modified from time-to-time by the ASP and sent intermittently to the website provider's network.

In general, users interacting with website providers perform data reads (e.g., actions related to data display and presentation) much more often than data writes (e.g., actions related to data creation, updating, or deletion). For instance, users at a retail shopping site browse and read category and product details (i.e., read data) much more often than purchase a product (i.e., write payment and delivery data related to their product purchase). In general website providers have to support many more data read requests than data write requests, often with the number of read requests being 10, 100, or even thousands of times the number of write requests. A benefit of this asymmetric approach to providing ASP services is that the website provider can use the ASP functionality related to data read requests without having to rely on the ASP network availability. This approach allows a relatively small ASP operation to support much larger website providers with huge amounts of website traffic.

A further understanding of the nature and the advantages of the inventions disclosed herein may be realized by reference of the remaining portions of the specification and the attached drawings.

DETAILED DESCRIPTION OF EMBODIMENTS

Figure 1:
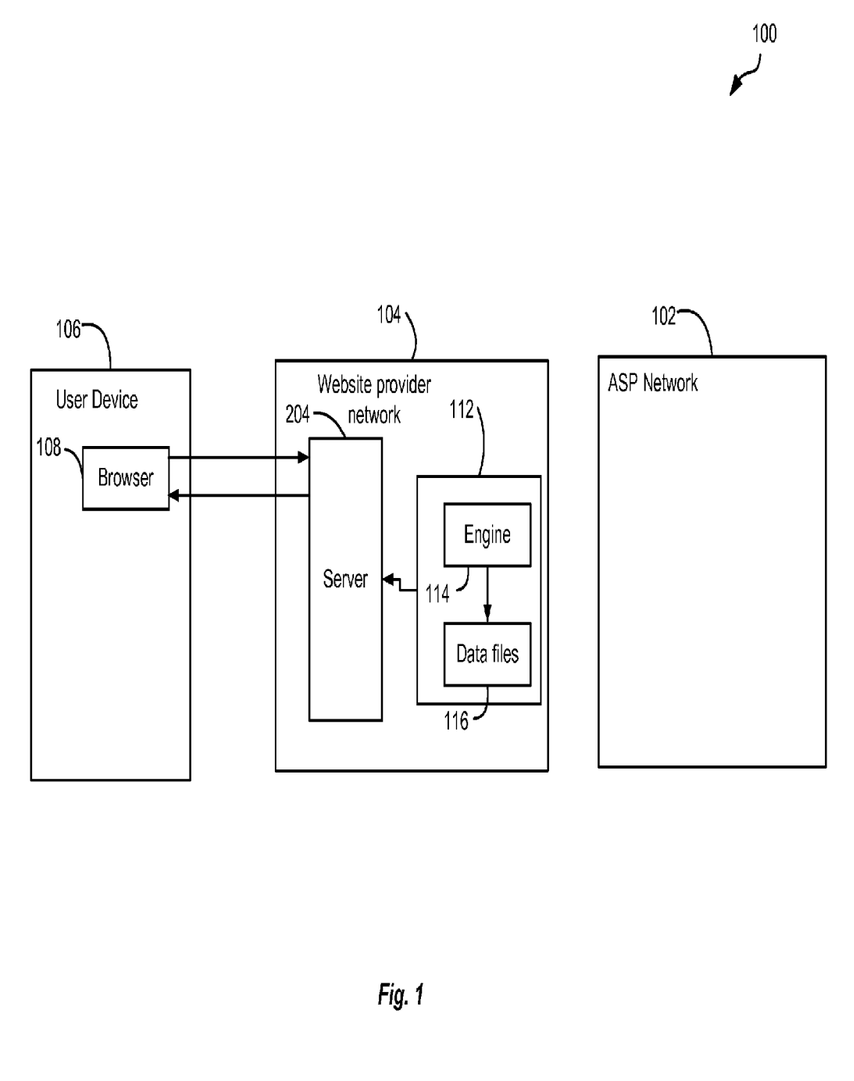
FIG. 1 depicts a simplified system for providing asymmetrical ASP functions according to one embodiment of the present invention.

FIG. 1 depicts a simplified system 100 for providing asymmetrical ASP functions according to one embodiment of the present invention. As shown, an ASP network 102, website provider network 104, and user device 106 are provided.

ASP network 102 provides some functionality to website provider network 104. For example, the functionality may be displaying information for a website. In one embodiment, reviews on a webpage associated with a website provider may be displayed using ASP functionality.

The website provider may be licensing the ASP functionality from ASP network 102. Although a website provider is described, it will be recognized that website provider may be any entity and does not need to be providing a website. Rather, the website provider may be any entity, user, company, etc. using ASP functionality provided by ASP network 102.

Website provider network 104 may be a network used by the website provider. Website provider network 104 may be owned by the website provider but that is not a requirement. For example, website provider network 104 may be leased by the website provider, owned by another entity, etc. The website provider provides access to users for a website using website provider network 104.

As shown, website provider network 104 includes a server 204 and file system 112. File system 112 is received from ASP network 102. For example, it may be uploaded by ASP network 102. File system 112 may include a display engine 114 and data files 116. Although file system 112 is shown including display engine 114 and data files 116 together, it will be understood that engine 114 and data files 116 may be stored separately and may not be in the same file system 112. Also, display engine 114 and data files 116 may be uploaded to website provider network 102 at different times. For example, display engine 114 may be uploaded at one time and then data files 116 may be uploaded. Also, updates to data files 116 may be provided without sending display engine 114 again. Further, although it is described that display engine 114 and data files 116 are uploaded from ASP network 102, they can be uploaded from any source.

Engine 114 provides functionality for processing or displaying a portion of the data files. Functionality may be any set of actions that are performed. For example, engine 114 may allow display of data in data files 116. In one embodiment, engine 114 may be a JavaScript™ display engine. It will be understood that other embodiments of engine 114 may be appreciated, such as an engine written in extensible mark-up language (XML) or any other language.

Data files 116 may include any information, such as text information. For example, in the case where reviews are being displayed, data files 116 may include reviews from users of a website provider's website.

Display engine 114 may be generated based on a format expected for data in data files 116. For example, for a website, data may be displayed in a certain way, such as reviews should be displayed in a certain format at a certain location of a webpage. Also, the data in data files 116 may be raw text. Display engine 114 is configured such that it can take the data in data files 116 and display it in the webpage as is desired.

User device 106 may be any computing device. For example, user device 106 may be a personal computer, laptop, personal digital assistant (PDA), cellular phone, set-top box, etc. User device 106 is associated with one or more users. A user may be an end user that is using a website associated with the website provider.

User device 106 may include a browser 108 that displays a page. Browser 108 may be an application that can display data. For example, browser 108 may be a web browser that displays webpages. Also, browser 108 may be non-web based, such as a WAP, wireless, TV, or a broadband browser.

When a user requests a webpage, a request is sent to website provider network 104 and received at server 204. In one embodiment, the request may be for data. For example, the request may be for data found in one or more data files 116. In one example, a webpage may be being displayed in browser 108, which may include user reviews. Browser 108 may make a request for the review data.

Website provider network 104 uses engine 114 and data files 116 to provide some functionality to user device 106. For example, the display of the data in the webpage displayed in browser 108. In one embodiment, engine 114 provides the functionality to display the reviews in data files 116.

Website provider network 104 is separate from ASP network 102. Website provider network 104 is a network that is hosting a website that is requested by users. Website provider network 104 receives requests from users and services the requests. Conventionally, to provide ASP functionality, website provider network 104 has to communicate with ASP network 102 on-demand for each ASP functionality request from users, including data reads and data writes. However, using embodiments of the present invention, website provider network 104 can provide the ASP functionality requested by its users through asymmetrical ASP interaction.

Asymmetrical ASP interaction may be providing application service provider functionality without contacting ASP network 102 on demand for each data read and data write request from users. Not contacting ASP network 102 on demand or in real-time may mean that ASP network 102 is not contacted when each request is received to perform some ASP functionality. Rather, a request may be serviced without contacting ASP network 102 at that moment.

Asymmetrical ASP interaction may require only single or intermittent contact with ASP network 102. For example, ASP network 102 may send file system 112 to website provider network 104. Website provider network 104 may then use engine 114 to provide ASP functionality using data from data files 116. This is provided without contacting ASP network 102 on demand. The ASP functionality is provided to website provider 104 so it does not need to maintain the data files or generate the actions to perform the functionality itself. In one embodiment, website provider network 104 relies on ASP functionality for interactive applications that require regular, frequent updates. These may be applications where website provider 104 wants to offload the maintaining of data to the ASP. The data may be changing frequently and the ASP can manage the data efficiently. Also, the ASP can provide the functionality for displaying the data that is being updated constantly. For example, engine 114 is used with data files 116, both of which can be updated by ASP network 102. However, the updates are not as frequent as data reads (i.e., requests related to data display) from users. For example, providing reviews on a website may require frequent displaying of customer reviews for the many products being offered. New reviews may be added at certain times but existing reviews may not need to be updated every time a request is received. Additionally, new reviews may not need to be updated immediately after they are submitted by customers, but may be updated intermittently in batches. Updates to these reviews, including new reviews, and the accompanying display functionality for them, may be provided through updates to engine 114 and data files 116 from ASP network 102 to website provider network 104.

Thus, at times, file system 112 may be provided from ASP network 102 to website provider network 104 to support ASP functionality. However, real-time or on-demand access to ASP network 102 is not needed to provide the ASP functionality. Web site provider network 104 may also request updates to engine 114 and/or data files 116. However, these requests may be intermittent and are not performed in response to requests for ASP functionality from users. Rather, the requests from users for ASP functionality can be processed without contacting ASP network 102. Thus, ASP network 102 does not need to be contacted every time requests are received from a user and processed.

Engine 114 may also provide advanced functionality. For example, engine 114 may provide sorting and pagination for the data without accessing ASP network 102 in real-time. The process of displaying the information will be described in more detail below. Other functionality may also be provided, such as the sending of data in the data files 116, printing of the data, etc.

ASP network 102 may not be contacted in real-time when reading data (e.g., displaying data) at user device 106; however, ASP network 102 may be contacted when data is written (e.g., data is created). For example, if ASP network 102 is providing functionality for user reviews, then when reviews are written using user device 106, the review data may be sent to ASP network 102 in real-time. In other embodiments, the review data may be stored and written at a later time, such as in a batch. The data write may occur in real-time or immediately when a review is submitted by a user because it may be expected that reviews will be written less often than the accessing and displaying of reviews.

One difference particular embodiments have over a traditional ASP is that the particular embodiments provide asymmetrical ASP interaction. For example, ASP network 102 is available on-demand for data writes, but not for data reads.

Accordingly, ASP-based application and web service functionality can be provided to website provider network 104 using asymmetrical ASP interaction. In general, for most website providers, the number of data read requests from users is 10, 100, or thousands more times than the number of data write requests. By shifting the processing of reads to website provider network 104, ASP network 102 does not have to service a large number of requests. This distributes the workload to website provider network 104. Thus, ASP network 102 may not need the infrastructure to handle all of the read requests that a website provider may receive. This may be useful as the ASP services a number of website providers, which multiplies the number of data reads that need to be serviced. For example, if a website provider receives 1 billion page views each month that is dependent on ASP functionality, then 1 billion data reads may need to be serviced by the ASP, and this is multiplied by every website provider that is using the ASP's services. This may require a large infrastructure on the part of the ASP if ASP network 102 services all the read requests. However, using particular embodiments, data reads may be serviced using the website provider's network 104 thus reducing the load on ASP network 102. If multiple website providers are being supported, the load is not increased on ASP network 102 for data reads.

In addition to reducing the load, advanced functionality is also provided through the display engine using asymmetrical ASP interaction. Pagination and sorting is still provided to a user without the need to contact ASP network 102, and without the need for complex database system or application server system integration. Costs may be reduced by not requiring ASP network 102 to be always available and capable of servicing data reads. This also allows ASP network 102 to be less complex and thus less costly.

Figure 2:
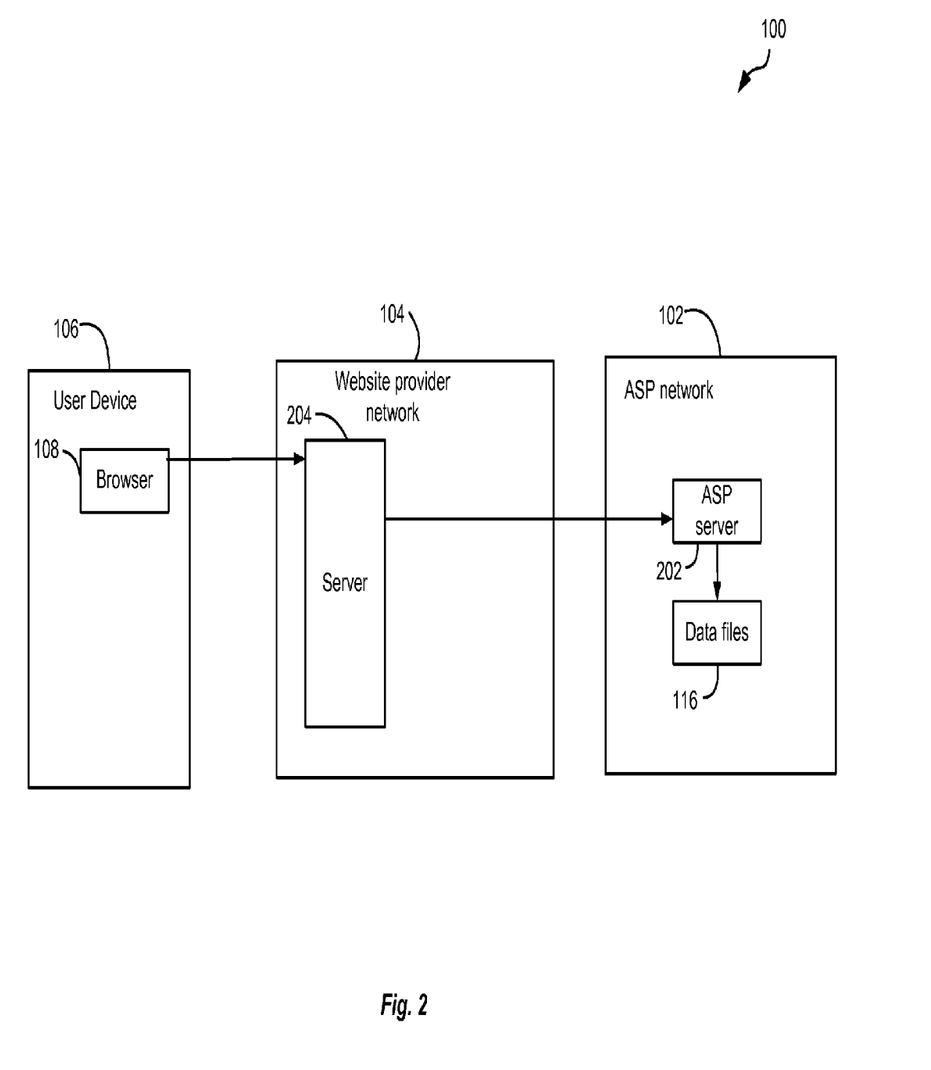
FIG. 2 depicts a simplified system for sending data to an ASP network according to one embodiment of the present invention.

FIG. 2 depicts a simplified system 100 for sending data to ASP network 102 according to one embodiment of the present invention. A user may generate a review in browser 108. A webpage may include text entry boxes in which a user can enter a review. Other methods may be provided that allows a user to enter a review. Review data may be sent by browser 108 to website provider network 104. Server 204 receives the review data and can forward it to ASP network 102.

In one embodiment, the review data is forwarded (i.e., the writing of data) to ASP network 102 in real-time. In other embodiments, website provider network server 204 may store the review data and forward it to ASP network 102 after certain time periods. The updates may be sent at any interval, such as every minute, every hour, daily, etc. The frequency of updates may be different depending on the service being provided. For example, if reviews on products are captured by website provider network 104, the new reviews may be transferred daily to ASP network 102.

When ASP network 102 receives the review data, an ASP server 202 can process it. For example, ASP server 202 may add the review data to one or more data files 116 that are being stored on ASP network 102. This may update the data in data files 116. For example, a review may be added to reviews already present in data files 116. The added review may later be displayed for a user in browser 108 when a new file system 112 is sent to website provider network 104, as will be discussed in FIG. 3.

Figure 3:
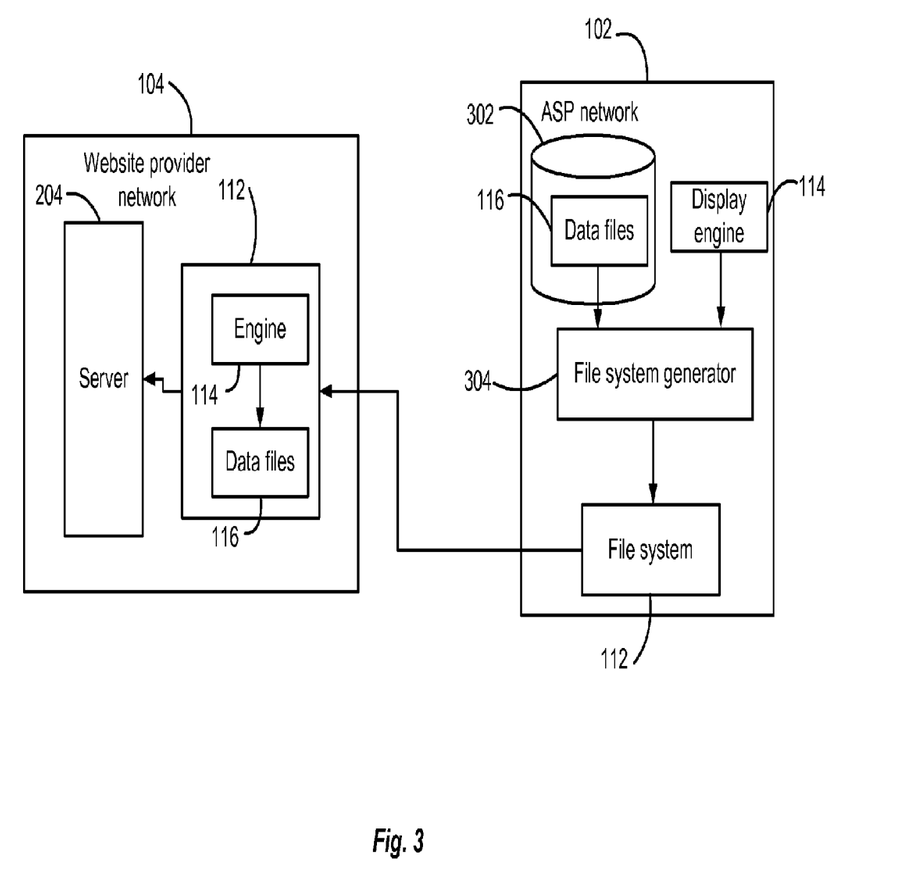
FIG. 3 shows a process for transferring a file system to a website provider network from the ASP network according to one embodiment of the present invention.

FIG. 3 shows a process for transferring file system 112 to website provider network 104 from ASP network 102 according to one embodiment of the present invention. ASP network 102 includes a file system generator 304. File system generator 304 is configured to generate file system 112 from data files 116, which are found in a database system 302. File system generator 304 also includes display engine 114 in file system 112. As discussed above, it is not necessary that display engine 114 and data files 116 be part of the same file system 112. For discussion purposes, file system 112 will be described as being part of the same file system 112 but this is not necessary. Further, display engine 114 and data files 116 do not need to be generated by the ASP but may be generated by another entity.

Different file systems 112 may be provided to different website providers. File system generator 304 determines a file system that should be transferred to a website provider's network 104. The appropriate data files 116 are then determined. For example, reviews for the website provider may be determined. Also, the appropriate display engine 114 to display the website provider's data is determined. Display engine 114 may include different features that are customized for a website provider. For example, different formatting may be provided (XML, tab delimited, comma-separated-values, text, binary, image, etc.). File system generator 304 packages display engine 114 and data files 116 into a file system 112.

File system generator 304 then sends file system 112 to website provider network 104. In one embodiment, file system 112 may be sent using file transfer protocol (FTP) or other transfer methods, such as gopher, to website provider network 104. Server 204 in website provider network 104 receives file system 112 and can store it in a directory, such as a web-accessible directory. Website provider network server 204 may then use file system 112 to provide ASP functionality to its users.

Figure 4:
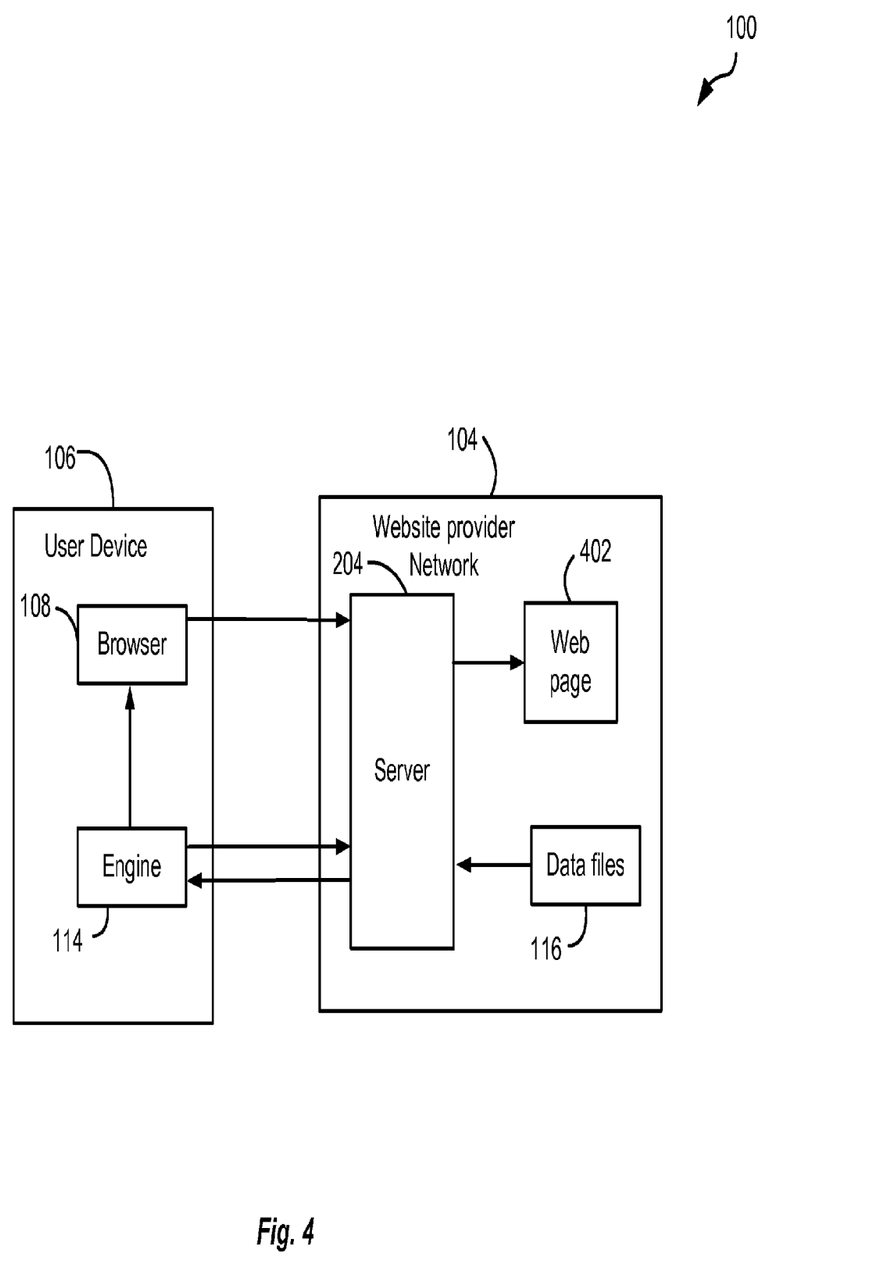
FIG. 4 depicts a process for providing the ASP functionality according to one embodiment of the present invention.

FIG. 4 depicts a process for providing the ASP functionality according to one embodiment of the present invention. Browser 108 may be accessing a webpage 402. The webpage may be developed using hypertext mark-up language (HTML) code. The HTML code may include information, such as JavaScript code, that invokes display engine 114. For example, the code may be inserted into a webpage by the website provider. The code then invokes engine 114 such that it can provide the ASP functionality.

In one embodiment, the first time that browser 108 requests data in data files 116, the code causes server 204 to upload engine 114 to user device 106. Engine 114 is then installed in user device 106.

Engine 114 then can retrieve data from data files 116 for display in browser 108. For example, when reviews are requested, engine 114 retrieves the reviews from data files 116 and can cause their display in browser 108. For example, they may be displayed in webpage 402 at browser 108.

As mentioned above, engine 114 may perform advanced functions in displaying the data. For example, sorting and pagination of the data may be provided. These functions may be provided using built-in capabilities of browser 108. This does not require any integration with an application server system or database system at website provider network 104 and does not require on-demand access to ASP network 102. In one embodiment, the advanced functionality is provided without requiring access to an application server system (e.g., Weblogic, Tomcat, JBoss, etc.) or a database system (e.g., Oracle, SQL server, MySQL, PostgresQL, etc.) at web site provider network 104. Data files 116 do not have to be integrated into a database system, and data display logic does not rely on or have to be programmed into the application server system.

In one embodiment, the framework used in browser 108 to provide the advanced functionality is referred to as Asynchronous JavaScript and XML (AJAX), which is a web development technique for creating interactive web applications. Accordingly, as different requests for data in data files 116 are received, engine 114 may access the data and display it in browser 108 using AJAX. This is all performed without access to ASP network 102.

Accordingly, ASP-based application and web service functionality can be provided to website provider network 104 using asymmetrical ASP interaction with ASP network 102. As these applications and web services become more popular as companies continue to outsource more technology-driven elements of their business, it is important to have the ASP functionality available at all times. In many of these applications, there are more data read requests than data write requests and thus the ASP network 102 needs to be accessed for these read requests continuously. This may become costly for ASP network 102 to service all the read requests. However, using embodiments of the present invention, the cost of servicing these requests is limited as website provider network 104 services the read requests instead of accessing ASP network 102. Additional costs related to read requests are not incurred as more and more website providers are serviced. Further, embodiments of the present invention do not require application server system or database system integration at website provider network 104 to provide the advanced functionality such as sorting and pagination.

Figure 5:
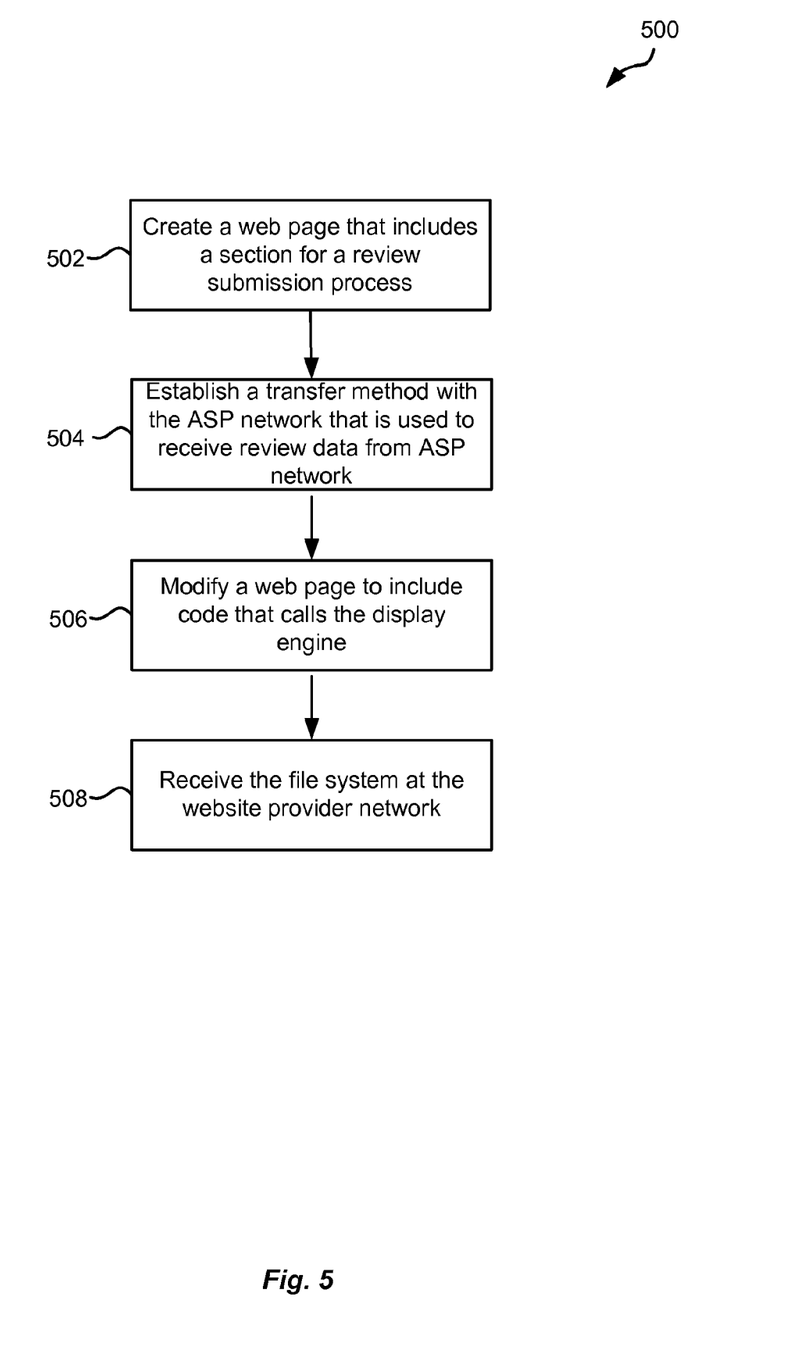
FIG. 5 depicts a simplified flowchart of a method for using embodiments of the present invention.

FIG. 5 depicts a simplified flowchart 500 of a method for using embodiments of the present invention. In step 502, a webpage is created that includes a section for a review submission process. For example, an iFrame may be created that frames a section such that user's can enter reviews. These reviews may be sent to ASP network 102.

In step 504, a transfer method is established with ASP network 102 that is used to receive review data from ASP network 102. The transfer method may be a FTP account that imports data into a web accessible directory. ASP network 102 can deliver file system 112 with the review data 116 and display engine 114 to the web accessible directory.

In step 506, a webpage is modified to include code that calls engine 114. For example, javascript code is added to a product, category, or other webpages. The javascript code calls engine 114 when reviews should be displayed.

In step 508, the file system is received at website provider network 104. The website provider can then display reviews to users using asymmetrical ASP interaction using the file system as described above. Functionality such as sorting and pagination of results may be used as well without contacting ASP network 102.

Accordingly, asymmetrical ASP interaction is provided. This interaction technique is useful for providing ASP functionality that does not depend on constantly changing data. For example, applications where it is not critical to have constant data updates may use embodiments of the present invention. In one embodiment, data can change or be updated at any desired rate such as intermittently, frequently, or constantly. In one example, a user may be browsing a webpage from a website provider. The webpage may include a frame that includes a review tab. Upon clicking on the tab, reviews may be shown. Using embodiments of the present invention, display engine 114 is used to retrieve the reviews from data files 116, which are stored in website provider network 104. This is performed without contacting ASP network 102. Accordingly, a user is provided ASP functionality for a webpage without the need to contact ASP network 102.

Although the invention has been described with respect to specific embodiments thereof, these embodiments are merely illustrative, and not restrictive of the invention.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method for providing local application service provider (ASP) functionality to a web server by an ASP server, the method comprising:
   generating one or more file systems based on the web server, the one or more file systems including i) one or more data files that are selected based on the web server from a database system, and ii) a display engine that is selected based on the web server;
   packaging the one or more data files and the display engine in the one or more file systems; and
   transmitting the one or more file systems to the web server;
   wherein the display engine is configured to receive a web request at the web server from a user device and generate:
      a first result of a first function using the display engine and the one or more data files in response to an indication that processing the web request can be performed locally without having to contact the ASP server, and a second result of a second function by transmitting information for the web request to the ASP server.

2. The method of claim 1, wherein the data files include user reviews.

3. The method of claim 1, wherein generating the one or more file systems comprises selecting the display engine based on visual formatting of the web server.

4. The method of claim 1, wherein generating the one or more file systems comprises generating the display engine to provide a pagination function as the first function.

5. The method of claim 1, wherein generating the one or more file systems comprises generating the display engine to provide a sorting function as the first function.

6. The method of claim 1, further comprising sending updates for the one or more data files to the web server at a first periodic interval.

7. The method of claim 6, further comprising receiving updates for the one or more data files at a second periodic interval, wherein the second periodic interval is less than the first periodic interval.

8. The method of claim 6, further comprising receiving updates for the one or more data files in real-time.

9. The method of claim 1, further comprising sending updates for the display engine independently from updates for the one or more data files.

10. The method of claim 1, wherein the one or more file systems comprise one or more first file systems, based on a first web server, the one or more first file systems including i) one or more first data files and ii) a first display engine; the method further comprising:
generating one or more second file systems based on a second web server, the one or more second file systems including i) one or more second data files, and ii) a second display engine;
transmitting the one or more second file systems to the second web server;
receiving first updates for the one or more first data files from the first web server; and
sending second updates for the one or more second data files, based on the first updates for the one or more first data files, to the second web server.

11. The method of claim 10, wherein:
sending the second updates comprises sending the second updates for the one or more second data files to the second web server at a first periodic interval; and
receiving the first updates comprises receiving the first updates for the one or more first data files from the first web server at a second periodic interval, wherein the second periodic interval is less than the first periodic interval.

12. An application service provider (ASP) server that provides ASP functionality to a web server, the ASP server comprising:

a hardware processor;
a non-transitory computer-readable medium;
a database; and
a file system generator;
wherein:
the file system generator determines a first file system that should be transferred to a first website provider network, the first file system including i) one or more first data files generated from the database, and ii) a first display engine;
the file system generator determines a second file system that should be transferred to a second website provider network, the second file system including i) one or more second data files generated from the database, and ii) a second display engine; and
the first display engine and the second display engine are configured to receive web requests from user devices at a web server of the corresponding website provider network and to generate a result of a first function using the corresponding display engine and corresponding data files in response to an indication that processing the web request can be performed locally without having to contact the ASP server;
the file system generator selects the first display engine and the second display engine based on the first website provider network and the second website provider network, respectively.

13. The ASP server of claim 12, wherein the file system generator generates the one or more first data files and the one or more second data files based on the first website provider network and the second website provider network, respectively.

14. The ASP server of claim 12, wherein the ASP server:
transmits the first file system to the first website provider network and transmits the second file system to the second website provider network;
receives first updates for the database from the first website provider network; and
sends second updates for the one or more second data files, based on the first updates for the database, to the second website provider network.

15. The ASP server of claim 14, wherein the ASP server:
receives third updates for the database from the second website provider network; and
sends fourth updates for the one or more first data files, based on the third updates for the database, to the first website provider network.

16. The ASP server of claim 14, wherein the ASP server:
sends the second updates for the one or more second data files at a first periodic interval;
receives the first updates for the database at a second periodic interval, wherein the second periodic interval is less than the first periodic interval.

17. The ASP server of claim 12, wherein the first display engine is different from the second display engine.

* * * * *